(12) United States Patent
Llamas Sandin et al.

(10) Patent No.: US 12,515,783 B2
(45) Date of Patent: Jan. 6, 2026

(54) AIRCRAFT TAIL SURFACE

(71) Applicant: AIRBUS OPERATIONS, S.L.U., Madrid (ES)

(72) Inventors: Raúl Carlos Llamas Sandin, Madrid (ES); Kwing So Choi, Nottingham (GB); Yaxing Wang, Nottingham (GB)

(73) Assignee: AIRBUS OPERATIONS, S.L.U., Madrid (ES)

( * ) Notice: Subject to any disclaimer, the term of this patent is extended or adjusted under 35 U.S.C. 154(b) by 0 days.

(21) Appl. No.: 18/949,383

(22) Filed: Nov. 15, 2024

(65) Prior Publication Data
US 2025/0162706 A1    May 22, 2025

(30) Foreign Application Priority Data
Nov. 17, 2023  (EP) ..................... 23383178

(51) Int. Cl.
*B64C 5/02* (2006.01)
(52) U.S. Cl.
CPC ..................... *B64C 5/02* (2013.01)
(58) Field of Classification Search
CPC .... B64C 5/02; B64C 5/16; B64C 5/18; B64C 5/08
See application file for complete search history.

(56) References Cited

U.S. PATENT DOCUMENTS

| | | | |
|---|---|---|---|
| 2,769,602 A | 11/1956 | Furlong | |
| 4,291,853 A | 9/1981 | Sigalla | |
| 6,318,677 B1 | 11/2001 | Dixon | |
| 10,093,411 B1 | 10/2018 | Adamson et al. | |
| 2013/0056585 A1* | 3/2013 | Llamas Sandin | B64C 5/02 244/134 E |
| 2015/0108269 A1* | 4/2015 | Lugg | B64C 1/26 244/13 |
| 2015/0158584 A1* | 6/2015 | Mores | B64C 27/82 244/17.21 |
| 2016/0031550 A1* | 2/2016 | Harrison | B64C 19/00 244/199.1 |
| 2021/0063147 A1* | 3/2021 | Jara Rodelgo | B64F 5/60 |

FOREIGN PATENT DOCUMENTS

WO    WO-2020145837 A1 *  7/2020

OTHER PUBLICATIONS

WO-2020145837-A1 English Translation.*
Extended Search Report for EP23383178.3, dated Apr. 12, 2024, 9 pages.

* cited by examiner

*Primary Examiner* — Assres H Woldemaryam
(74) *Attorney, Agent, or Firm* — Nixon & Vanderhye P.C.

(57) ABSTRACT

An aircraft tail including: a leading edge, a trailing edge, a tip and a root, and a single protrusion protruding from the leading edge, wherein the single protrusion protrudes from the leading edge only in a direction opposite to the trailing edge and is closer to the tip than to the root, and includes a first lateral side and a second lateral side that originate from different points of the leading edge along the tail span, wherein the first lateral side is closer to the tip than to the second lateral side, and the protrusion is entirely in a section of the leading edge between 50% and 95% of the tail span from the root.

17 Claims, 12 Drawing Sheets

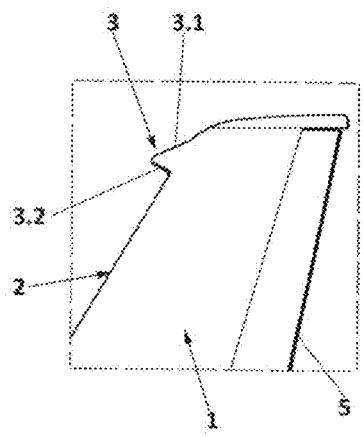
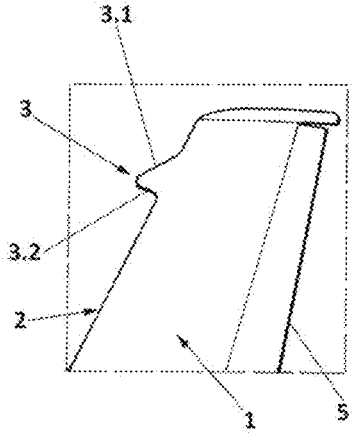
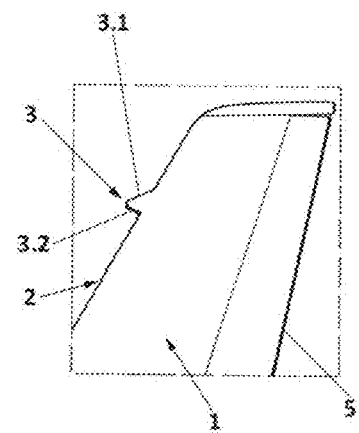
FIG. 3A      FIG. 3B      FIG. 3C
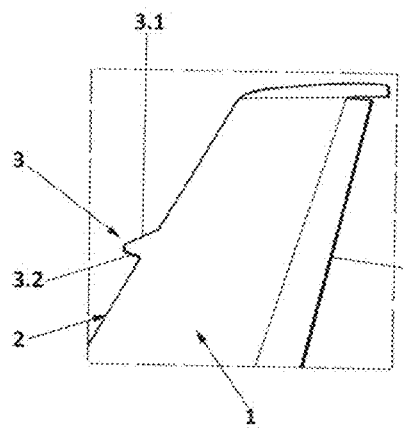
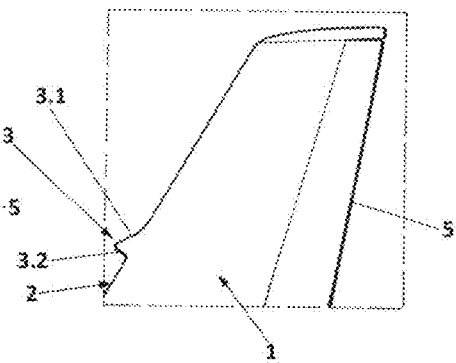
FIG. 3D      FIG. 3E

AIRCRAFT TAIL SURFACE

RELATED APPLICATION

This application incorporates by reference and claims European patent application EP 23383178.3, filed Nov. 17, 2023.

TECHNICAL FIELD

The present invention refers to aircraft tail surfaces and more particularly to a configuration of an aircraft tail surface with a single protrusion for improving air flow control with no or negligible drag penalty.

BACKGROUND

The performance of aircraft tail surfaces, such as the horizontal tail plane and the vertical tail plane, is an important matter in global aircraft design because said surfaces are used to control the aircraft and must provide stabilizing forces across a range of challenging flight and environmental conditions.

Known configurations that influence the aerodynamics of tail surfaces are vortex generators. Vortex generators are typically small protrusions across the airflow that are generally placed on the low pressure side of an airfoil of the tail surface. Some vortex generators are known as "dogtooth" and "notches" and are arranged on the leading edge of the tail surface.

The vortex generators typically represent discontinuities that create vortices. The purpose of these vortex generators is to create vortices in a controlled and predictable manner. Vortices are often undesirable because they produce drag, but the vortices these devices create are beneficial since they delay wing stall. Stall occurs when a wing reaches a high enough angle of attack that the airflow separates from its surface. This flow separation results in a rapid loss of lift, and the aircraft may become uncontrollable. These vortices help maintain a boundary layer of flowing air attached to the wing.

A notched leading edge and a dogtooth work in a similar manner to increase the speed of the flow over a portion of a wing and delay stall. The difference between these devices is the strength of the vortex each one generates, the conditions under which the vortex forms, and the region of the wing affected by that vortex. Vortex generators are typically used in a series to create a number of small vortices over a large portion of wing. A dogtooth also generates a single strong vortex and a notch usually generates a pair of strong vortices, one from each edge of the notch.

Another example of configurations that are known are the fence and the vortilon. A fence is most often used on a swept wing as a means of controlling spanwise flow. This type of flow occurs when the air flowing over a backward swept wing moves outward towards the wingtip as it travels along the wing. This motion is undesirable because it can often cause flow separation to occur on the wing outer surface resulting in a loss of aileron control effectiveness. The purpose of a fence is to redirect the flow aft towards the trailing edge. A further benefit of the fence is that it can be used to create a vortex to locally increase the speed of the flow and delay separation.

A vortilon serves the same purpose on the lower surface of a wing, and this device is often referred to as an underwing fence for that reason. Like the traditional boundary layer fence, the vortilon can also be used to create a vortex on the underside of the wing at low angle of attack. The vortilon is far more useful at high angles, however, when a second vortex travels around the leading edge and over the upper surface of the wing. This vortex helps delay separation over the upper surface.

The majority of the configurations described above are typically seen on military aircraft, especially high-performance fighters. The leading edge extension, dogtooth, and fences are particularly common on these airplanes since these devices increase the stall angle of attack and improve maneuverability. These modifications are rarely seen on commercial airliners where excellent maneuverability is unnecessary. However, conventional vortex generators are quite common on airliners to increase the effectiveness of flaps and other control surfaces during takeoff and landing. In any case, all of these vortex generations configurations provide high cost in drag in cruise due to the local flow separation.

Accordingly, different configurations have been designed in recent years to improve the performance of the aircraft tail surfaces. The present invention provides a new and improved configuration for aircraft tail surfaces that optimizes safety, performance and maintenance thereof, and provides further related advantages.

SUMMARY

In a first inventive aspect, the present invention may provide an aircraft tail surface comprising a leading edge, a trailing edge, a tip and a root, wherein the aircraft tail surface further comprises a single protrusion protruding from the leading edge, wherein the protrusion: protrudes from the leading edge only in a direction opposite to the trailing edge and is located closer to the tip than to the root; and comprises a first lateral side and a second lateral side that originate from different points of the leading edge along the tail span, said points being not coincident with the tip or the root; wherein the first lateral side is more proximal to the tip than the second lateral side; and wherein the protrusion is located entirely in a section of the leading edge that is comprised between the 50% and 95% of the tail span from the root.

The present invention may be embodied to provide a modification for the tail surfaces based on a single protrusion projecting from the leading edge of the tail surface. That is, the invention may be embodied as placing only one protrusion, as a flow-control device, protruding from the leading edge in the aircraft tail surface for enhancing airflow control on the aircraft tail surface.

Specifically, this protrusion may be arranged protruding from the leading edge only in a direction opposite to the trailing edge. In addition, the protrusion is closer to the tip than to the root.

The single protrusion may comprise two lateral sides, namely a first lateral side and a second lateral side. These lateral sides originate from different points of the leading edge along the tail span. Said points from which the lateral sides are originated are not coincident with the tip or root of the aircraft tail surface. Furthermore, the first lateral side is more proximal to the tip than the second lateral side.

Moreover, the protrusion may be located entirely in a leading edge section comprised between the 50% and 95% of the tail span from the root. These percentages of the tail span correspond to the respective point of intersection between each lateral side of the protrusion and the leading edge. That is, the points of the leading edge from which the lateral sides of the protrusion originate are comprised in said span range (50%-95%) from the root, where the position 0% corresponds to the root. In other words, the entire protrusion including the points of intersection of its lateral sides with the leading edge falls within said span range.

In an embodiment, the protrusion is located entirely in a section of the leading edge between 60% and 80% of the tail span from the root. In an embodiment, the point of the leading edge from which the second lateral side originates is located at one of the following positions: 66.6% and 75% of the tail span from the root.

Comparing with the prior art solutions such as a tail surface without protrusion or with a plurality of protrusions, the present aircraft tail surface including a single protrusion in this span section provides greater performance across a range of aircraft tail metrics such as side force and drag versus side-slip angles. Advantageously, this protrusion provided in the tail surface improves airflow control of the tail surface and enables greater surface control forces, which allows to reduce aircraft tail weight and size leading to enhanced fuel efficiency, materials savings and a reduction in carbon emissions.

More specifically, the provision of such protrusion on the aircraft tail surface delivers greater side force coefficient with minimum adverse effect on the drag coefficient across a range of side-slip angles. The level of performance improvement in the side-force coefficient is in the order of 5% relative to the same aircraft tail surface without protrusion.

In an embodiment, the first lateral side and the second lateral side of the protrusion converge in a protrusion tip. The protrusion tip is the part of the protrusion furthest from the leading edge.

In an embodiment, the aircraft tail surface is a backward swept surface or a forward swept surface. In an embodiment, the first lateral side of the protrusion is longer than the second lateral side of the protrusion, or the second lateral side of the protrusion is longer than the first lateral side of the protrusion, or both first and second lateral sides of the protrusion have a same length. Specifically, for the backward swept surfaces the first lateral side i.e. the lateral side of the protrusion proximal to the tip, is longer than the second lateral side i.e. the lateral side proximal to the root. However, for the forward swept surfaces, the second lateral side is longer than the first lateral side.

In an embodiment, the first lateral side and/or the second lateral side of the protrusion are curved.

In an embodiment, the first lateral side and/or the second lateral side comprise a convex shape.

In an embodiment, the protrusion comprises a sinusoidal shape. In another embodiment, the protrusion comprises a sawtooth shape. In other words, the combination of the lateral sides of the protrusion and protrusion tip has a sinusoidal shape or a sawtooth shape.

In an embodiment, the first lateral side and the second lateral side of the protrusion are blended into the leading edge of the tail surface by smooth curve fitting in terms of geometric configuration. This configuration improves the aerodynamics on the aircraft tail surface.

In an embodiment, the distance that the protrusion protrudes from the leading edge is comprised between 4% and 12% of the mean aerodynamic chord.

In an embodiment, the protrusion extends along the tail span between 4% and 12% of the tail span, between the tip and root, and preferably between 6% and 9% of the tail span. The extension of the protrusion along a % of the tail span will be understood as the length between the corresponding points of the leading edge from which the protrusion or its lateral sides originates. Accordingly, the protrusion of this embodiment is very small relative to the tail span of the tail surface and therefore, the protrusion delivers greater side force coefficient with minimum adverse effect on the drag coefficient across a range of side-slip angles allowing possible reduction of aircraft tail surface size and this could lead to weight reduction. These advantages contribute to the improvement of fuel consumption without sacrificing the aircraft performance.

In an embodiment, the aircraft tail surface is a horizontal tail surface. In another embodiment, the aircraft tail surface is a vertical tail surface.

In an embodiment, a length-to-width (span-to-chord) ratio of the protrusion is comprised between 0.8 and 1.2, and preferably, is 1 (one). In other words, the ratio between the length and the width of the protrusion is comprised between 0.8 and 1.2, and the ratio may be 1. The length of the protrusion is determined by the distance that the protrusion protrudes from the leading edge of the tail surface towards the protrusion tip. The width of the protrusion is determined by the maximum distance between the first and second lateral sides of the protrusion.

In a second inventive aspect, the present invention provides an aircraft comprising at least one aircraft tail surface according to the first inventive aspect.

DESCRIPTION OF DRAWINGS

These and other characteristics and advantages of the invention will become clearly understood in view of the detailed description of the invention which becomes apparent from a preferred embodiment of the invention, given just as an example and not being limited thereto, with reference to the drawings.

FIGS. 3A to 3E show different embodiments of an aircraft tail surface according to the present invention.

DETAILED DESCRIPTION

Figure 1:
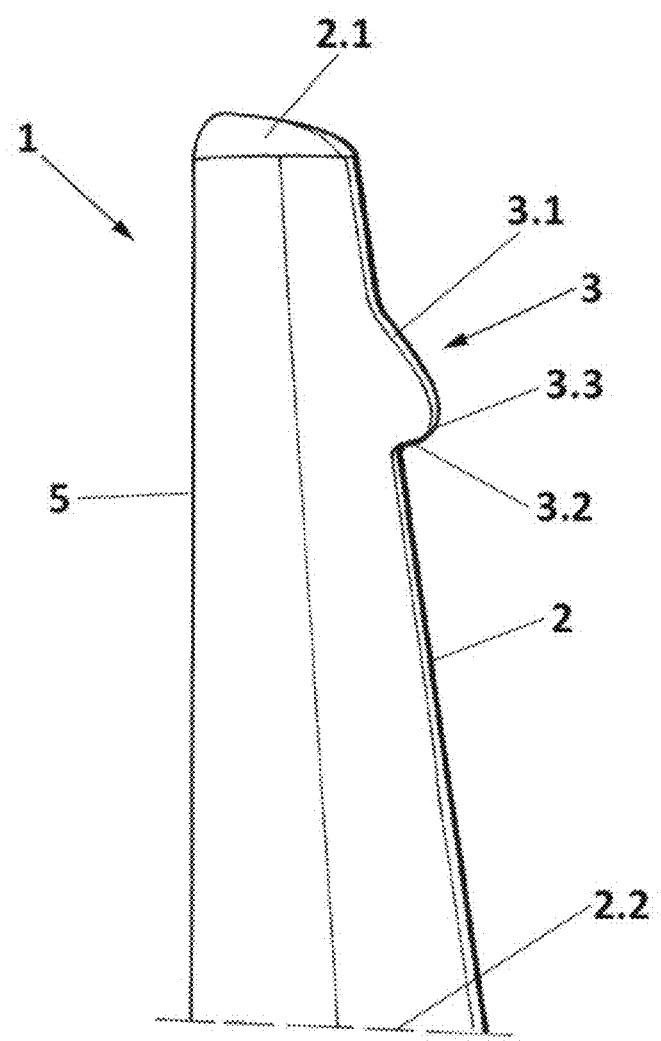
FIG. 1 is a schematic view of an aircraft tail surface according to an embodiment of the present invention.
Figure 2:
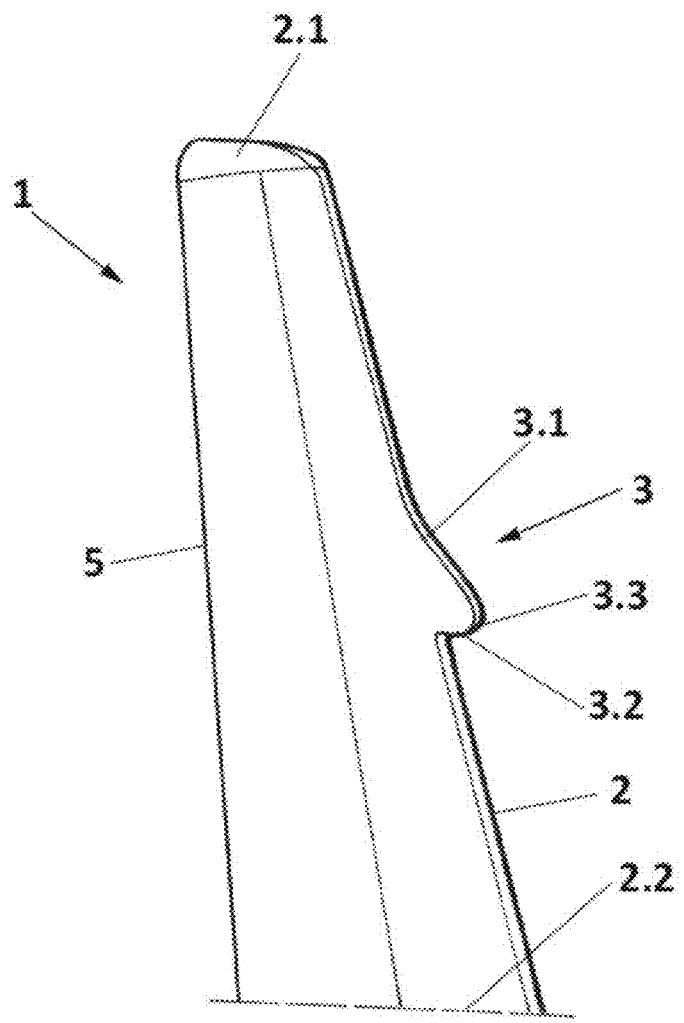
FIG. 2 is a schematic view of an aircraft tail surface according to an embodiment of the present invention.

FIGS. 1 and 2 show aircraft tail surfaces according to two embodiments of the present invention. FIGS. 1 and 2 show a vertical tail surface (1) provided with only one protrusion (3) but located at different points along the leading edge (2) of the vertical tail surface (1) according to each figure. Both figures show that the vertical tail surface (1) comprises a leading edge (2) with a tip (2.1) and root (2.2), and a trailing edge (5) opposite to the leading edge (2). The tail surface (also referred to as a vertical tail or horizontal tail of a tail assembly) includes outer surfaces exposed to airflow, internal spars and ribs and control surfaces.

The leading edge (2) may extend in a straight or gently curved line, except for the one protrusion (3), from the root (2.2) to the tip (2.1). The one protrusion (3) extends forward of the straight or gently curved line of the leading edge (2). The root (2.2) may include a fillet around the perimeter of the root that provides an aerodynamic transition between the aircraft tail surface (1) and a fuselage to which the tail surface is attached. The root (2.2) may also include a ridge extending from an upper portion of the fuselage to a lower portion of the leading edge. The tip (2.1) is a section at a distal end of the tail surface which includes an outer tip edge and curved or segmented edges transitioning from a straight portion of the leading edge to the outer tip edge.

As mentioned, these vertical tail surfaces (1) of FIGS. 1 and 2 further comprise a single protrusion (3) that protrudes from the leading edge (2). Specifically, the protrusion (3) protrudes only in a direction opposite to the trailing edge (5) as a surface continuation of the vertical tail surface (1.2). In both FIGS. 1 and 2, the protrusion (3) is placed closer to the tip (2.1) than to the root (2.2). Moreover, the protrusion (3) shown in FIG. 1 is closer to the tip (2.1) than the protrusion (3) shown in FIG. 2.

The protrusion (3) shown in these FIGS. 1 and 2 comprises a first lateral side (3.1) and a second lateral side (3.2), the first lateral side (3.1) being more proximal to the tip (2.1) than the second lateral side (3.2). Each of the first (3.1) and second (3.2) lateral sides originates from a point of the leading edge (2) along the tail span. These points are not coincident with each other and with the tip (2.1) or root (2.2). The first lateral side (3.1) extends from the leading edge (2) to a protrusion tip (3.3) at the apex of the protrusion (3). The second lateral side (3.2) extends from the leading edge (2) to the protrusion tip (3.3).

The protrusion (3) is located entirely in a section of the leading edge (2) between 50% and 95% of the span of the tail (tail span) from the root (2.2) to the tip (2.1). The intersection point of the first lateral side (3.1) with the leading edge (2) and the intersection point of the second lateral side (3.2) with the leading edge (2) are located within the mentioned range of 50% to 95% of the tail span.

According to the embodiments shown in these FIGS. 1 and 2, the first lateral side (3.1) of the protrusion (3) is longer than the second lateral side (3.2). In addition, both lateral sides (3.1, 3.2) converge in a protrusion tip (3.3) and are curved. As it can be observed in these figures, the first lateral side (3.1) and the second lateral side (3.2) may each have a convex shape along their respective lengths.

In the embodiments shown in FIGS. 1 and 2, the protrusion (3) protrudes from the leading edge (2) a distance comprised between 4% and 12% of a mean aerodynamic chord of the vertical tail surface (1.2) between the leading edge and the trailing edge. In addition, in these embodiments the protrusion extends along the tail span between 6% and 9% of the tail span of the vertical tail surface (1.2).

In an embodiment wherein the aircraft tail surface (1) is a vertical tail surface (1.2), the protrusion protrudes from the leading edge (2) 7.56% of the mean aerodynamic chord of the vertical tail plane, extends along 7.5% of the tail span and is located in a leading edge section comprised between 85% and 92.5% of the tail span from the root (2.2).

FIGS. 3A to 3E show several embodiments of the invention in which the protrusion (3) is located at different positions along the tail span of a vertical tail surface (1.2). The protrusion (3) of these embodiments comprises a first lateral side (3.1) and a second lateral side (3.2). The first lateral side (3.1) being longer and more proximal to the tip (2.1) than the second lateral side (3.2). The first (3.1) and second (3.2) lateral sides originates from the leading edge (2) at different points along the tail span. These points are not coincident with the tip (2.1) nor the root (2.2). The first (3.1) and second (3.2) lateral sides converge in a protrusion tip (3.1). In this embodiment, the protrusion (3) comprises a sawtooth shape in cross-section taken in a plane of the vertical tail surface.

In FIG. 3A, the intersection point of the second lateral side (3.2) of the protrusion (3) with the leading edge (2) is at 91.7% of tail span from root (2.2). In FIG. 3B, the intersection point of the second lateral side (3.2) of the protrusion (3) with the leading edge (2) is at 82.3% of tail span from root (2.2). In FIG. 3C, the intersection point of the second lateral side (3.2) of the protrusion (3) with the leading edge (2) is at 75% of tail span from root (2.2). In FIG. 3D, the intersection point of the second lateral side (3.2) of the protrusion (3) with the leading edge (2) is at 66,6% of tail span from root (2.2). In FIG. 3E, the intersection point of the second lateral side (3.2) of the protrusion (3) with the leading edge (2) is at 58.4% of tail span from root (2.2). In any of the embodiments of FIGS. 3A to 3E, the protrusion (3) protrudes from the leading edge (2) a distance in a range of 4% to 12% of the mean aerodynamic chord of the vertical tail surface (1.2). Further, also for these embodiments, the protrusion (3) extends along the tail span between 4% and 12% of the tail span.

Side-force coefficient "Cs" versus side-slip angle "B" for each of the embodiments of FIGS. 3A-3E (representing different locations of the protrusion in the vertical tail surface along the leading edge) have been compared with a baseline (representing a vertical tail surface without a protrusion according to the prior art) at rudder angles of 0°, 10°, 20° and 30°. Furthermore, drag coefficient "Cd" versus side-slip angle "B" for each of the embodiments of FIGS. 3A-3E (representing different locations of the protrusion in the vertical tail surface along the leading edge) have been compared with a baseline (representing a vertical tail surface without a protrusion) at rudder angles of 0°, 10°, 20° and 30°. The rudder angle is the angle of the rudder relative to the vertical tail surface. The side-slip angle is the directional angle of attack of the vertical tail surface, that is, the angle between the aerodynamic profile of the vertical tail surface and the airflow impacting the vertical tail surface. The term side-slip angle is used for vertical tail surface and the term angle of attack is used for horizontal tail planes or wings.

Figure 4A:
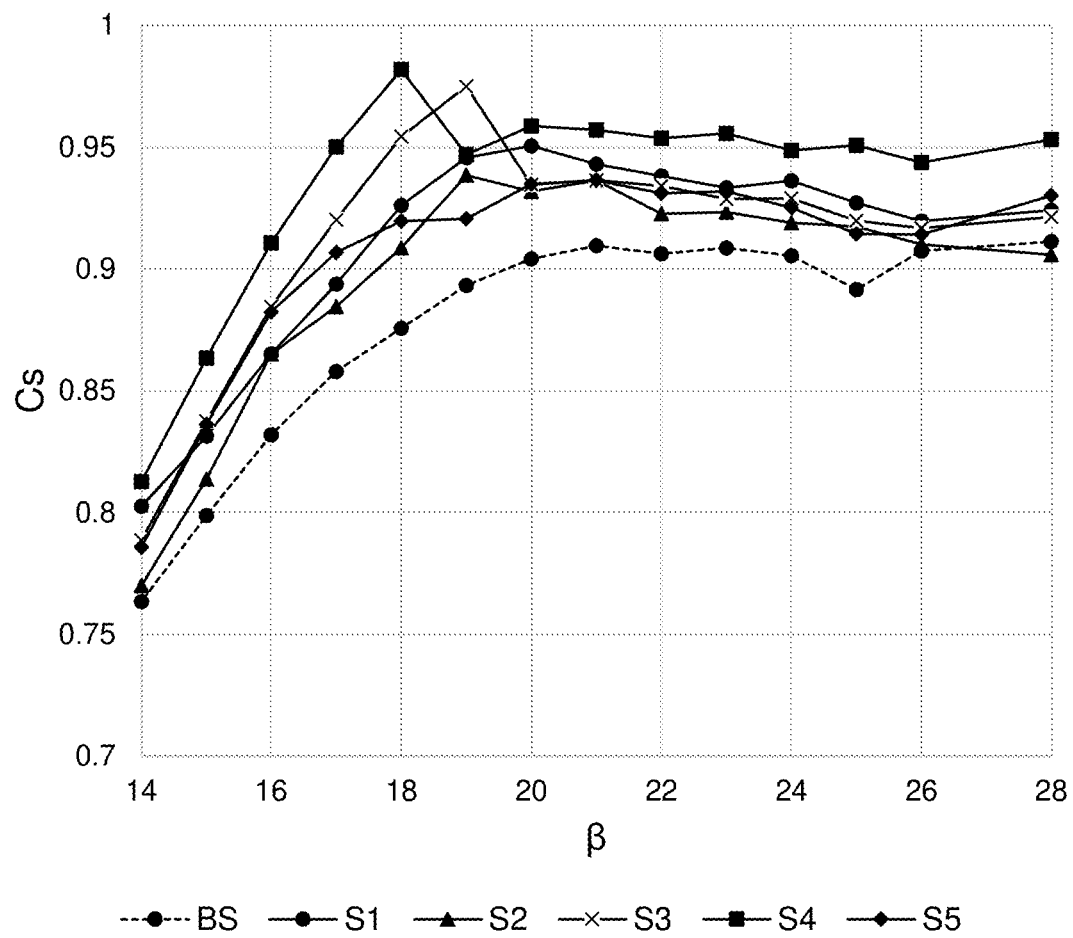
FIG. 4A is a graph comparing side-force coefficient for an aircraft tail surface according to embodiments of the present invention with 0° of rudder angle.
Figure 4B:
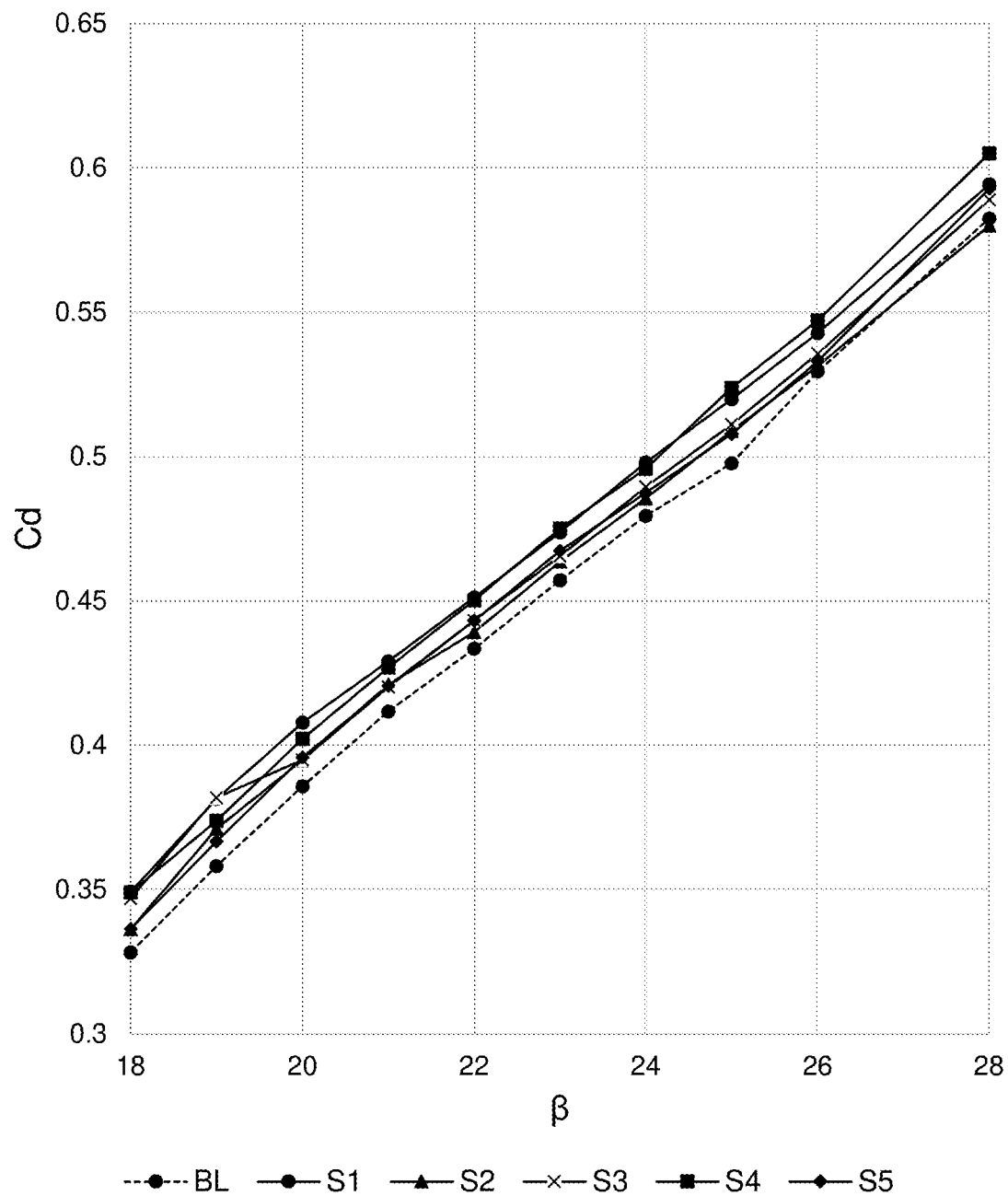
FIG. 4B is a graph comparing drag coefficient for an aircraft tail surface according to embodiments of the present invention with 0° of rudder angle.
Figure 5A:
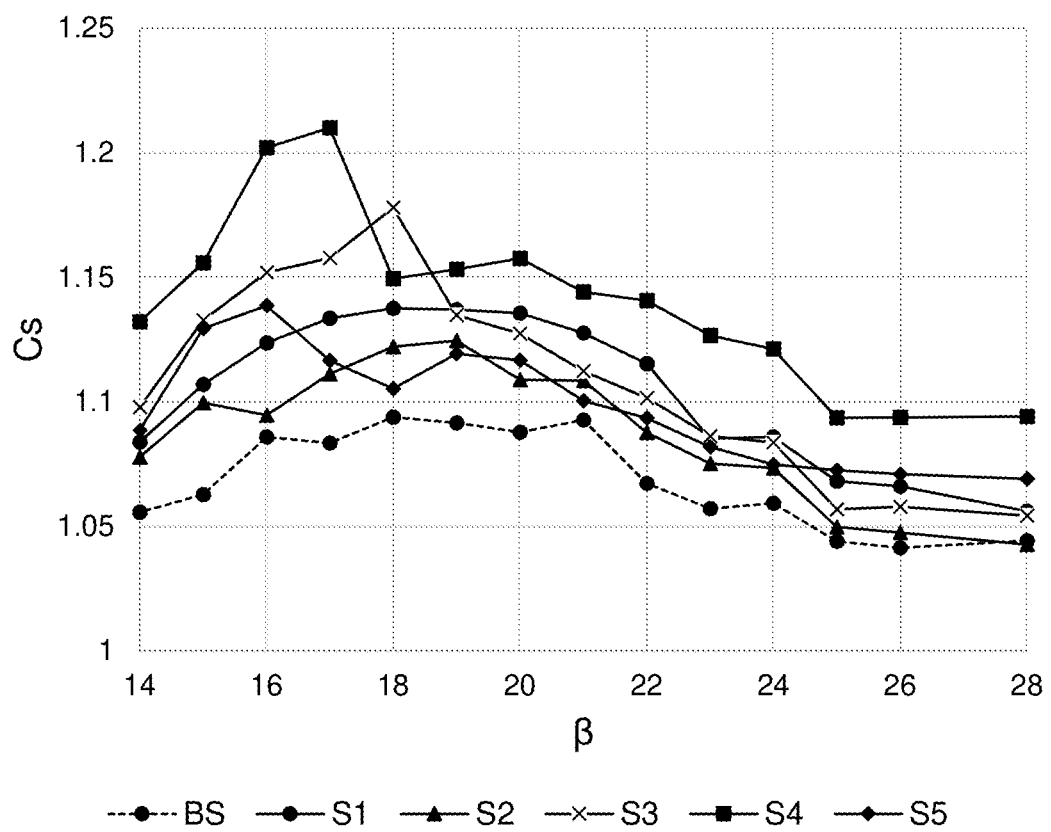
FIG. 5A is a graph comparing side-force coefficient for an aircraft tail surface according to embodiments of the present invention with 10° of rudder angle.
Figure 5B:
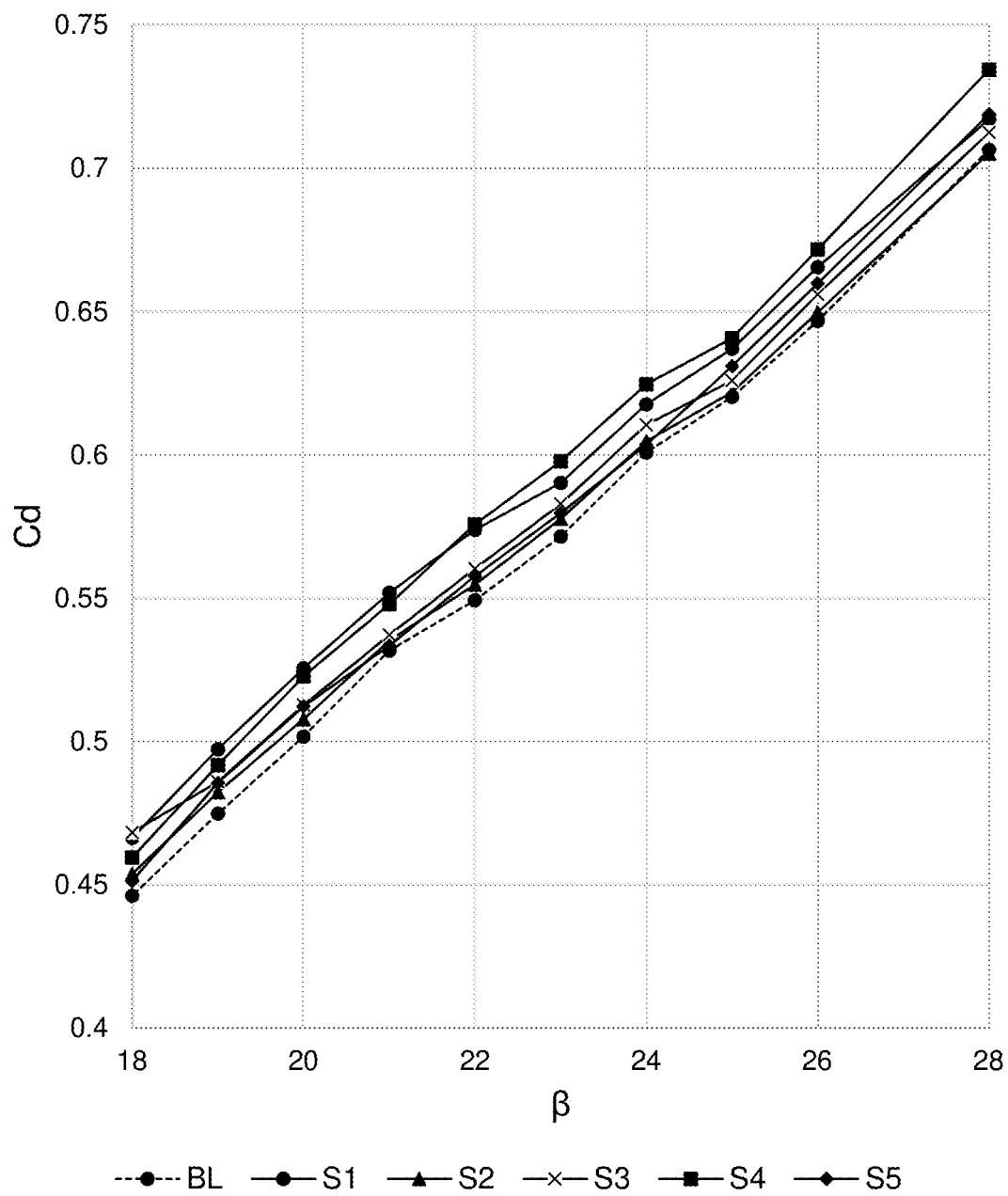
FIG. 5B is a graph comparing drag coefficient for an aircraft tail surface according to embodiments of the present invention with 10° of rudder angle.
Figure 6A:
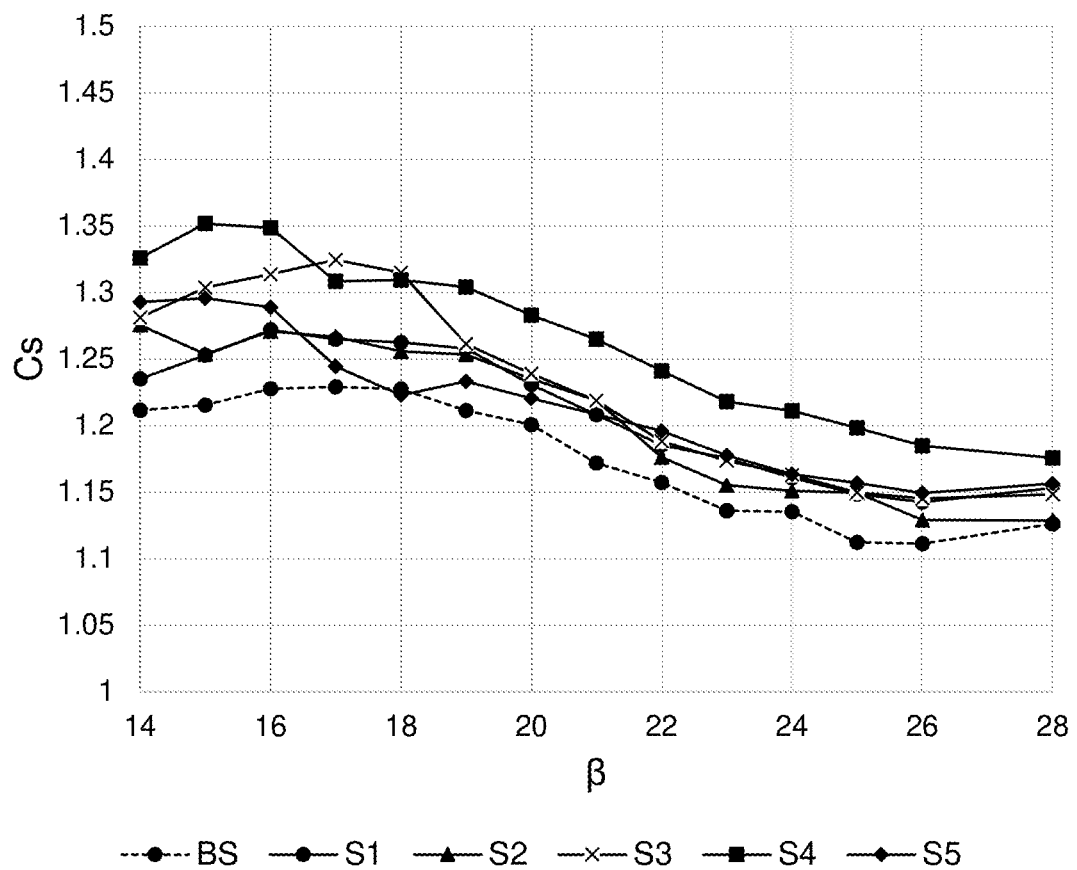
FIG. 6A is a graph comparing side-force coefficient for an aircraft tail surface according to embodiments of the present invention with 20° of rudder angle.
Figure 6B:
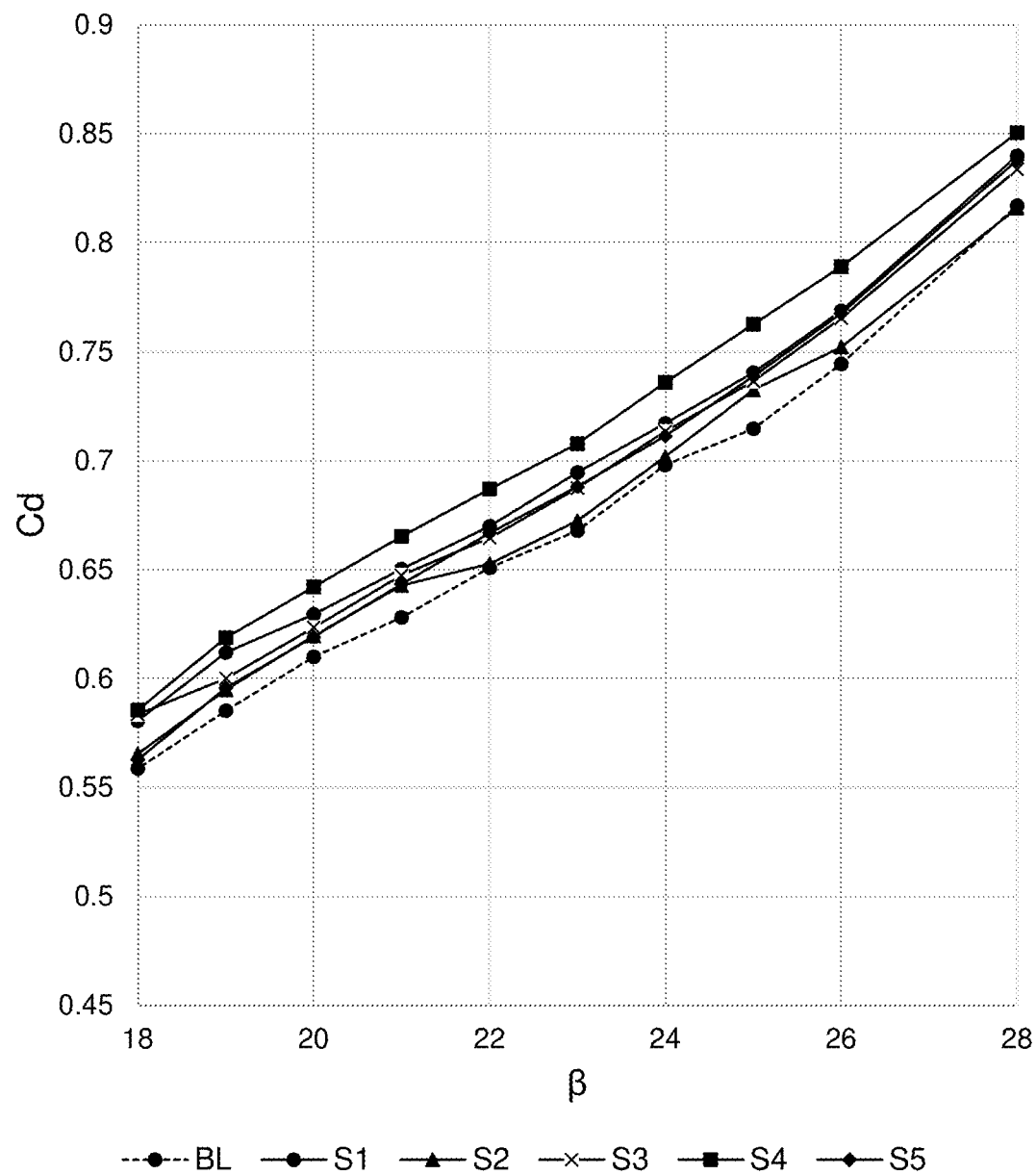
FIG. 6B is a graph comparing drag coefficient for an aircraft tail surface according to embodiments of the present invention with 20° of rudder angle.
Figure 7A:
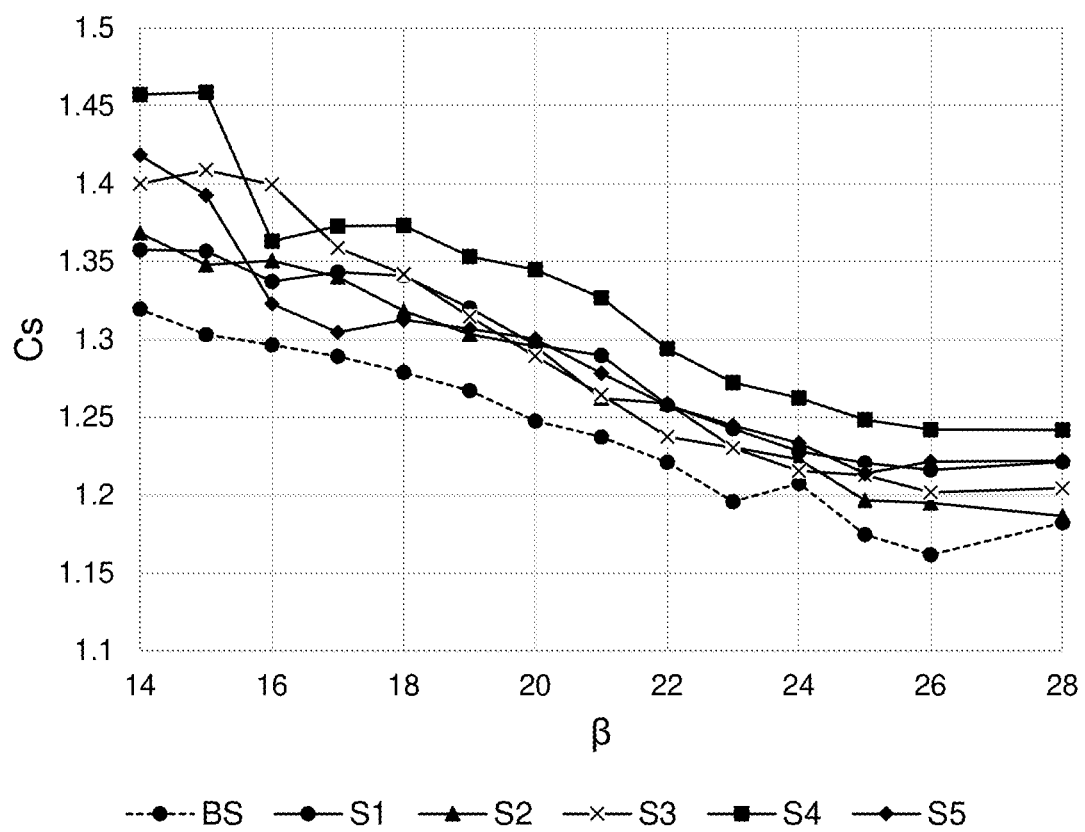
FIG. 7A is a graph comparing side-force coefficient for an aircraft tail surface according to embodiments of the present invention with 30° of rudder angle.
Figure 7B:
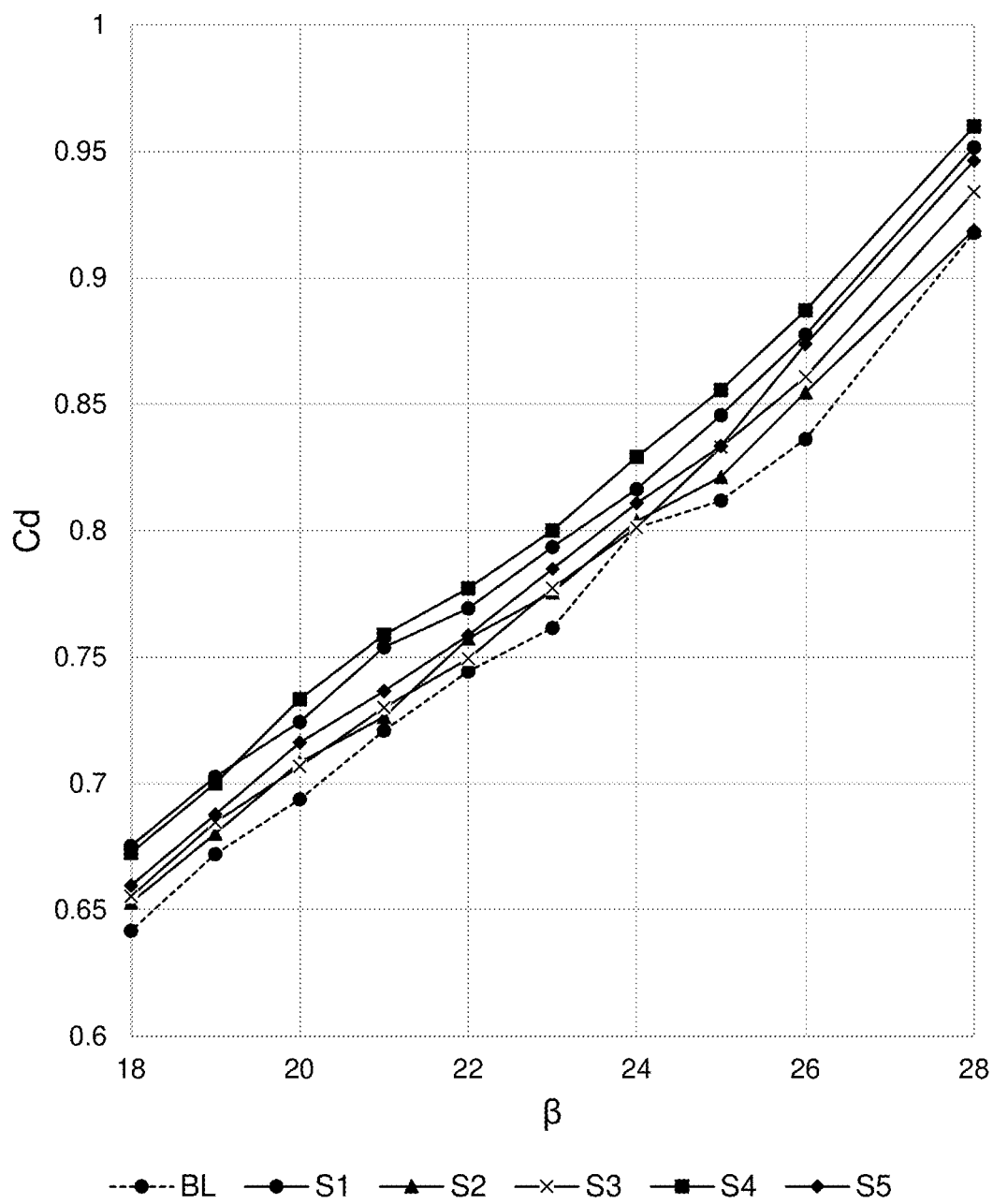
FIG. 7B is a graph comparing drag coefficient for an aircraft tail surface according to embodiments of the present invention with 30° of rudder angle.

Considering a rudder angle of 0°, FIG. 4A shows a graph of Cs versus β for each embodiment of FIGS. 3A-3E (denoted S1-S5, respectively) compared with a baseline (denoted BS). In addition, FIG. 4B shows a graph of Cd versus β for each embodiment of FIGS. 3A-3E (S1-S5 respectively) compared with a baseline (BS). Considering a rudder angle of 10°, FIG. 5A shows a graph of Cs versus β for each embodiment of FIGS. 3A-3E (denoted S1-S5, respectively) compared with a baseline (denoted BS). In addition, FIG. 5B shows a graph of Cd versus β for each embodiment of FIGS. 3A-3E (S1-S5 respectively) compared with a baseline (BS). Considering a rudder angle of 20°, FIG. 6A shows a graph of Cs versus β for each embodiment of FIGS. 3A-3E (denoted S1-S5, respectively) compared with a baseline (denoted BS). In addition, FIG. 6B shows a graph of Cd versus B for each embodiment of FIGS. 3A-3E (S1-S5 respectively) compared with a baseline (BS). Considering a rudder angle of 30°, FIG. 7A shows a graph of Cs versus β for each embodiment of FIGS. 3A-3E (denoted S1-S5, respectively) compared with a baseline (denoted BS). In addition, FIG. 7B shows a graph of Cd versus β for each embodiment of FIGS. 3A-3E (S1-S5 respectively) compared with a baseline (BS).

From these data comparison in FIGS. 4A to 7B, it can be concluded that, for each embodiment of FIGS. 3A-3E, the side-force coefficient Cs generated on the vertical tail surface (1.2) is increased by the provision of the protrusion (3) according to the present invention configuration (specifically according to the embodiments shown in FIGS. 3A-3E) compared to the baseline, therefore the vertical tail surface (1.2) control is improved at high side-slip angles compared to a baseline, with a very limited/null impact on the drag coefficient Cd. Thus there is very little or no negative impact on fuel consumption.

Figure 8:
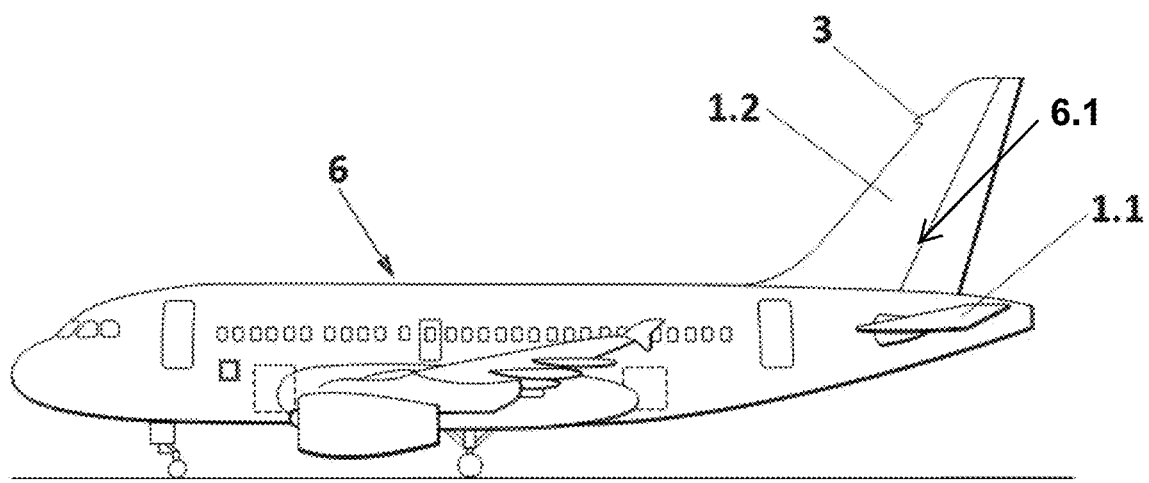
FIG. 8 is a schematic view of an aircraft according to an embodiment of the present invention.

FIG. 8 shows an aircraft (6) according to an embodiment of the present invention. This aircraft (6) comprises a horizontal tail (1.1) and a vertical tail (1.2), the vertical tail (1.2) including a protrusion (3). The horizontal and vertical tails are in an empennage (6.1) (tail assembly) of aircraft (6)

The invention may be embodied as an aircraft tail surface: (1) comprising a leading edge (2), a trailing edge (5), a tip (2.1) and a root (2.2), wherein the aircraft tail surface (1) further comprises a single protrusion (3) protruding from the leading edge (2), wherein the protrusion (3): protrudes from the leading edge (2) only in a direction opposite to the trailing edge (5) and is located closer to the tip (2.1) than to the root (2.2); and comprises a first lateral side (3.1) and a second lateral side (3.2) that originate from different points of the leading edge (2) along the tail span, said points being not coincident with the tip (2.1) or the root (2.2); wherein the first lateral side (3.1) is more proximal to the tip (2.1) than the second lateral side (2.3); and wherein the protrusion (3) is located entirely in a section of the leading edge (2) that is comprised between the 50% and 95% of the tail span from the root (2.2).

The first lateral side (3.1) and the second lateral side (3.2) of the protrusion (3) may converge in a protrusion tip (3.3).

The first lateral side (3.1) and/or the second lateral side (3.2) of the protrusion (3) may be curved.

The first lateral side (3.1) and/or the second lateral side (3.2) may comprise a convex shape.

The protrusion (3) may comprise a sinusoidal shape or a sawtooth shape.

The protrusion may be located entirely in a section of the leading edge (2) between 60% and 80% of the tail span from the root (2.4).

A distance that the protrusion (3) protrudes from the leading edge (2) may be between 4% and 12% of a mean aerodynamic chord of the aircraft tail surface (1).

The protrusion (3) may extend along the tail span between 4% and 12% of the tail span, or be between 6% and 9% of the tail span.

The aircraft tail surface (1) may be a horizontal tail surface (1.1) or a vertical tail surface (1.2).

The aircraft tail surface (1) may have a backward swept surface or a forward swept surface.

A length-to-width ratio of the protrusion (3) may be in a range of 0.8 and 1.2, or 1.

The project leading to this application has received funding from the Clean Sky 2 Joint Undertaking (JU) under grant agreement No 864290. The JU receives support from the European Union's Horizon 2020 research and innovation program and the Clean Sky 2 JU members other than the Union.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft tail comprising:
   a leading edge, a trailing edge, a tip and a root, and
   a single protrusion protruding from the leading edge,
   wherein the single protrusion protrudes from the leading edge only in a direction opposite to the trailing edge and is closer to the tip than to the root; and
   wherein the single protrusion includes a first lateral side and a second lateral side that each originate from leading edge at different points along a tail span of the leading edge and converge at a protrusion tip,
   wherein the different points are not coincident with the tip or the root,
   wherein the first lateral side is closer to the tip than to the second lateral side,
   wherein the single protrusion is located entirely in a section of the leading edge between 50% and 95% of the tail span starting from the root,
   wherein the single protrusion has a length extending from the leading edge to the protrusion tip in a direction parallel to a chord of the aircraft tail and a width extending in a direction perpendicular to the length,
   wherein a ratio of the length to the width of the single protrusion is in a range of 0.8 to 1.2, and
   wherein the single protrusion is asymmetrical about a line extending parallel to the chord and passing through the protrusion tip.

2. The aircraft tail according to claim 1, wherein the first lateral side and the second lateral side converge at the protrusion tip.

3. The aircraft tail according to claim 1, wherein at least one of the first lateral side or the second lateral side are curved.

4. The aircraft tail according to claim 1, wherein at least one of the first lateral side or the second lateral side have a convex shape in a plane of the aircraft tail.

5. The aircraft tail according to claim 1, wherein the first lateral side forms an angle with respect to the chord that is a greater angle than an angle formed by the second lateral side with respect to the chordwise direction.

6. The aircraft tail according to claim 1, wherein the single protrusion is entirely in a section of the leading edge in a range of 60% to 80% of the tail span from the root.

7. The aircraft tail according to claim 1, wherein the length of the single protrusion is in a range of 4% to 12% of a mean aerodynamic chord of the aircraft tail, and the mean aerodynamic chord is a mean chord length of chord lengths along the tail span from the root to the tip of the vertical tail.

8. The aircraft tail according to claim 1, wherein the single protrusion extends along the tail span in a range of 4% to 12% of the tail span.

9. The aircraft tail according to claim 1, wherein the aircraft tail is a horizontal tail of an aircraft empennage.

10. The aircraft tail according to claim 1, wherein the aircraft tail is a vertical tail of an aircraft empennage.

11. The aircraft tail according to claim 1, wherein the leading edge has a backward swept or a forward swept along the tail span.

12. The aircraft tail according to claim 1, wherein the length-to-width ratio of the single protrusion is 1.

13. An aircraft comprising the aircraft tail according to claim 1.

14. A vertical tail in an aircraft tail assembly including:
a leading edge and a trailing edge, each extending from a root of the vertical tail to a tip of the vertical tail; and
a single protrusion extending from and forward of the leading edge, wherein the single protrusion includes:
a first lateral edge extending from a first point on the leading edge to a protrusion tip at a forwardmost portion of the single protrusion; and
a second lateral edge extending from a second point on the leading edge to the protrusion tip,
wherein the second point is closer to the root than is the first point,
wherein the single protrusion is entirely within a section of the leading edge between 50% and 95% of a span of the leading edge starting from the root,
wherein the single protrusion has a length extending from the leading edge to the protrusion tip in a chordwise direction of the vertical tail and a width extending in a direction perpendicular to the length, and
wherein a ratio of the length and the width of the single protrusion is in a range of 0.8 to 1.2, and
wherein the single protrusion is shaped asymmetrically about a direction extending chordwise through the vertical tail and passing through the protrusion tip.

15. The vertical tail of claim 14, wherein the first lateral edge is longer than the second lateral edge.

16. The vertical tail of claim 14, wherein the length of the single protrusion is in a range of 4% to 12% of a mean aerodynamic chord of the vertical tail surface.

17. The vertical tail of claim 14, wherein the width of the single protrusion is in a range of 4% to 12% of a mean aerodynamic chord of the vertical tail surface, wherein the mean aerodynamic chord is between the leading edge and the trailing edge of the vertical tail and is a mean value of chord lengths along the tail span from the root to the tip of the vertical tail.

* * * * *